United States Patent [19]

O'Neill

[11] 4,201,595

[45] May 6, 1980

[54] PROCESS FOR PREPARING CALCINED GYPSUM AND GYPSUM BOARD

[75] Inventor: Eugene E. O'Neill, Okeene, Okla.

[73] Assignee: United States Gypsum Company, Chicago, Ill.

[21] Appl. No.: 939,624

[22] Filed: Sep. 5, 1978

Related U.S. Application Data

[63] Continuation-in-part of Ser. No. 777,213, Mar. 14, 1977, Pat. No. 4,117,070.

[51] Int. Cl.$^2$ .............................................. C04B 11/00
[52] U.S. Cl. .................................... 106/109; 106/110; 156/39
[58] Field of Search .................. 106/109, 110; 156/39

[56] References Cited

U.S. PATENT DOCUMENTS

| | | | |
|---|---|---|---|
| 3,486,965 | 12/1969 | Janninck | 106/110 |
| 3,616,173 | 10/1971 | Green et al. | 106/110 |
| 3,947,285 | 3/1976 | Jones et al. | 106/110 |
| 3,980,487 | 9/1976 | Akabayashi et al. | 106/110 |

FOREIGN PATENT DOCUMENTS 698052 11/1964 Canada ..................................... 106/109

*Primary Examiner*—James Poer
*Attorney, Agent, or Firm*—Kenneth E. Roberts; Robert H. Robinson; Samuel Kurlandsky

[57] ABSTRACT

A process for preparing calcined gypsum (stucco) which comprises treating a mass of calcined gypsum by adding, with thorough blending, small portions of water (about 1–10% by weight) to the calcined gypsum, allowing it to heal, and grinding the healed stucco to recapture the rate of strength development and the ultimate strength which are adversely affected by the water addition. The principal advantage provided by the addition of small portions of water is a reduction in water demand which is retained despite the grinding and optional drying of the healed stucco. If the treated calcined gypsum is not used shortly after the healing procedure, it should be dried to provide storage stability. The reduced water demand is particularly useful in gypsum board manufacture.

21 Claims, No Drawings

PROCESS FOR PREPARING CALCINED GYPSUM AND GYPSUM BOARD

CROSS REFERENCE TO RELATED APPLICATIONS

This application is a continuation-in-part of U.S. Patent Application Ser. No. 777,213 filed Mar. 14, 1977, and now U.S. Pat. No. 4,117,070. U.S. Patent Application Ser. No. 788,953 filed Apr. 19, 1977, and now U.S. Pat. No. 4,153,373, is also a continuation-in-part of Application Ser. No. 777,213, now U.S. Pat. No. 4,117,070.

BACKGROUND OF THE INVENTION

Continuously calcined gypsum (stucco), because of processing conditions in its preparation, differs in physical properties from stuccos made by other processes. When gypsum is continuously calcined, a high number of small fractures occur in the calcium sulfate particles. During wet mixing of continuously calcined gypsum with water to form a slurry, very small fractions of the calcium sulfate particles rapidly break from the particle because of the fissuring of the fractured particle. Thus, for example, the mean particle size of the continuously calcined gypsum particles after calcination may be approximately 19 microns, and during wet mixing of that stucco, 1 to 3 micron sized fragments will rapidly flake off the particles. This disintegration is a desirable characteristic in some respects, for it provides a high rate of hydration or "set suddenness", and a high ultimate strength of the set gypsum because of the high surface area of the fragments. This disintegration of the particles, however, also results in undesirable high water demand due to the much higher surface area of the stucco fragments.

In automated gypsum board manufacture, a large portion of the processing time and processing energy is devoted to removing excess water from the wet board. Considerable excess water is required in gypsum board manufacture to properly fluidize the calcined gypsum and obtain proper flow of the gypsum slurry. Thus, calcined gypsum made by continuous calcination may have a dispersed consistency of about 100–150 cc. "Dispersed consistency" for purposes of gypsum board manufacture in accordance with the present invention may be defined as the water volume required to give a standard viscosity or flow when 100 grams of calcined gypsum is dispersed by mechanical mixing in a high speed blender for 7 seconds which is equivalent to that encountered in the board forming line. While the dispersed consistency may be expressed in a particular numerical figure, it will be appreciated that any particular number is variable from one processing line to the next depending on the particular stucco and the amount of flow for that stucco being most desirable for that particular processing line.

A dispersed consistency value of 100–150 cc. indicates a water requirement of about 85–100 parts of water per 100 parts of the calcined gypsum for an acceptable slurry in a modern automated gypsum board plant. The theoretical water required to convert the calcined gypsum (calcium sulfate hemihydrate or stucco) to set gypsum dihydrate is only 18.7% by weight on a pure basis. This leaves about 67 to about 82% of the water present in the gypsum slurry to be removed in drying the board. Ordinarily, gypsum board dryers in an automated gypsum board manufacturing line will remove this water, for example, by maintaining the temperature at about 400° F. and requiring a drying time of about 40 minutes. Of course, the time-temperature relationship is variable from one processing plant to another depending upon the particular gypsum source and processing equipment.

In addition, line speed of the board slurry line is affected by the setting time and the set suddenness of the calcined gypsum slurry. Thus, calcined gypsum made by continuous calcination will ordinarily be adjusted to have a temperature rise set of about 8 minutes and a set suddenness rate of about 9° F. per minute.

In my copending U.S. Patent Application Ser. Nos. 777,213 and 788,953 there are described apparatus and processes for continuously treating calcined gypsum so as to lower the water demand and provide a treated gypsum mass which may be continuously fed into the slurry mixer of an automated gypsum board line. The treatment comprises thoroughly blending small amounts of water into the calcined gypsum, resulting in a damp but dry appearing material and allowing it to "heal" before usage in gypsum board production. By "healing" is meant allowing the small amounts of free water to remain on the calcined gypsum particle surface for a short period of time, about 1–10 minutes, and it is believed that this permits the fractures on the particles to fuse so as to resist subsequent disintegration of the particle into numerous micron sized fractions during slurry mixing. The healed stucco is particularly suitable for immediate utilization in gypsum board manufacture; however, if such material is not used right away, the set suddenness of the healed stucco begins to vary erratically. "Set suddenness", for purposes of the present invention, may be defined as the maximum rate of temperature rise of the exothermic stucco temperature-time curve. The development of set suddenness is important in providing adequate ultimate strength of the cast gypsum product.

It has been found that board manufactured by the process of adding a small amount of water to the calcined gypsum to reduce water demand is considerably weaker at the same board core density than if untreated calcined gypsum were used in making the board. The calcined gypsum produced by the continuous process, depending on the gypsum source, may be low in ultimate strength development, and the further reduction in ultimate strength resulting from the above-described processes of water treatment may produce an unacceptable board. Further, the water-treated calcined gypsum of such process should be used in gypsum board production immediately after healing or else dried after healing, for the water-treated calcined gypsum is not storage stable.

SUMMARY OF THE INVENTION

This invention relates to a process for preparing calcined gypsum (stucco) whose properties in general, e.g. set time, pouring consistency, rate of strength development, and other properties, are particularly adapted for use in gypsum board manufacture. The invention also relates to a process for continuously treating calcined gypsum to produce a healed calcium sulfate hemihydrate having the property of lowered water demand, which provides significant energy savings in the manufacture of gypsum wallboard.

A principal object and advantage of the present invention is the provision of a process for treating calcined gypsum so as to lower the water demand without substantially impairing the ability of the treated, calcined gypsum to produce acceptable ultimate strength in cast products such as gypsum board.

Another object is the provision of a process for treating continuously calcined gypsum so as to lower the water demand and also provide a treated material which is storage stable.

A further object is the provision of a continuous process for treating calcined gypsum so as to reduce substantially water requirements of the calcined gypsum on subsequent use in cast products such as gypsum board by up to about 20% or more while maintaining the ultimate strength of the treated material at least about 90% of the untreated material's strength.

In one embodiment of the present invention, it has been found that the loss in strength of the set gypsum cast and rate of strength development caused by the water treatment and healing process can be recaptured by grinding the treated material after healing. While it is known in the art that some improvement in cast strength is provided by grinding ordinary, completely dry stucco prior to mixing with water (U.S. Pat. No. 3,480,387), it was expected that the reduced water demand advantages of the water treatment and healing process would be lost in grinding this material to produce strengths equivalent to untreated stucco material. One skilled in the art would expect the rigors of grinding to reopen the healed fissures and cause fractures in the particle's surface, thereby eliminating the water reduction advantage. It was also expected that evaporation of the free water by drying the treated stucco after healing would adversely affect the reduced water demand. However, it has not been found that the reduced water demand provided by water treatment and healing is not lost by grinding the water treated stucco after healing so as to increase the surface area of the healed stucco.

While it is only a theory of operation, it is now believed that in "healing", the small fractures in the calcined gypsum particles are fused to the particle by dissolution caused by the small amount of free water present for a short period of time on the particles' surface. In a sense, it is believed that the small amount of localized water on the surface of the particles, during the healing time, acts to weld the fractures and fissures so that they resist rapidly breaking off of the particle into small fractions when the particle is later mixed with the larger quantities of water for hydration in gypsum board manufacture or slurrying during production of industrial plaster. Further, it is now believed that grinding of the healed particles creates fresh surface portions as a reactivation of surface sites to provide energy for set suddeness during subsequent hydration with mixing water.

DESCRIPTION OF THE PREFERRED EMBODIMENTS

The calcined gypsum feed material may be any product of conventional batch or continuous calcination from any gypsum source, such as natural rock or that derived from chemical processes, including blends of natural rock gypsum and chemical process gypsum. For use in gypsum board manufacture, it is particularly preferred that the feed material be continuously calcined gypsum which will generally have a dispersed consistency of about 100-150 cc. Of course, the dispersed consistency may vary depending upon the gypsum source and manufacturing procedures well known to those skilled in the art. It is preferred for the production of industrial bagged stucco that the gypsum be a high quality, white material, either natural rock or derived from chemical processes or blends thereof. As previously mentioned, the calcined gypsum feed material may be produced by batch or continuous kettle calcination, or by any other means such as calcined gypsum obtained from heated conveyor or rotary calciners, moving bed calciners, or suspended gas stream calciners such as heated cyclone calciners.

Calcined gypsum from natural rock will generally have a surface area of about 3,000-5,500 square centimeters per gram, determined by the air permeability method (Blaine), depending upon the calcining procedure and rock properties. Calcined gypsum derived from chemical processes will normally have a surface area of about 1,500-2,000 square centimeters per gram (Blaine). It is understood that the calcined gypsum feed material derived from chemical processes, preferably hemihydrate, may include materials that may already have been ground or partially reground for other purposes, such as to provide a particular dry cast density/strength relationship.

The small amount of water to be added initially to the calcined gypsum material to carry out this invention is dependent primarily upon the degree of water demand reducing effect desired. Generally, it will be about 1-10% by weight of the total calcined gypsum feed. Maximum effectiveness of water demand reduction appears to be accomplished upon incorporation of about 3% of free water into the calcined gypsum but this may vary depending upon the temperature and properties of the calcined gypsum. This may be accomplished by adding the water to the total amount of calcined gypsum feed or by applying such treatment to only a portion and then recombining, with thorough blending, the water treated portion with the untreated portion of the calcined gypsum feed. Naturally, there may be some losses through evaporation, over spray and the like during the water addition, so in general, more than the 3% preferred amount is actually added. The water may be added to either hot calcined gypsum (e.g. immediately after calcining) or cooled calcined gypsum, with more water generally being required for warmer material than for cooled material. The 3% optimum addition of water is based upon calcined gypsum that has been cooled to approximately ambient or room temperature, and thus, as mentioned above, it is desirable to incorporate more than the optimum when heated material is being treated. The calcined gypsum should, however, be below about 220° F. and preferably below 200° F., for most effective treatment.

Any method to provide a limited and small amount of free water on the surface of the calcined gypsum may be employed. Ordinarily, liquid water will be added directly to the calcined gypsum; however, the water addition may also be carried out by adding steam and cooling the calcined gypsum to condense water onto the surface or by having the steam condensed by the previously cooled calcined gypsum particles. It is also possible, provided some strength loss can be tolerated, to add considerably more than the optimum amount of water, such as 10% by weight, particularly if the treated material will be used immediately to make board.

The water treated calcined gypsum is briefly healed, generally for around 1-7 minutes and more preferably around 2-4 minutes, immediately after treatment and before further processing. The duration of the healing depends upon the manner of the water addition and the size of the unit by which the water is incorporated. Large capacity, rapidly rotating beater or paddle type blenders, which are conventional to the art may be used to add the water. These generally require less healing time than smaller capacity, more slowly metered, continuous blenders. Generally, sufficient healing time may be provided while transporting the water treated calcined gypsum from the blender to the next processing station. For example, screw conveyors and other transporting means may be adjusted in their flow rate to provide the time required for healing after water treatment and before feeding the treated material to the grinding station or to the slurry mixer in board forming operations. Such conveying means may need to be adjusted to provide the proper healing time for the amount of water added in the blender. Lower amounts of water will generally require less healing time, which for about 3% by weight of water will be on the order of about 1–4 minutes.

The water treated and healed calcined gypsum is not stable, and therefore, it should be dried before storage for any prolonged period of time. Some drying may be desired if more than the optimun water is added during the water treatment or to protect against shutdowns in the continuous operation of a board making line, for drying enables the treated material to be stored without excessive localized hydration and subsequent impairment of the flow characteristics. The drying conditions (e.g. temperature and time) should be selected so as not to remove the chemically combined water. It is generally preferred to avoid drying if at all possible in order to save time and energy; however, if drying is found to be necessary or desirable, it should be performed before grinding. It is possible to water treat the calcined gypsum, heal it, dry it, store it for a period of time, and subsequently grind the treated material and still obtain the advantages (reduced water demand and recapture of strength properties) of this invention. If the water treated and healed calcined gypsum is to be used immediately in the production of gypsum board, then it is usually not necessary to dry the treated material before grinding.

If the treated material is not to be used immediately in production, as when bagged plasters are to be made, it is preferred to dry thoroughly the material to provide storage stability. This also permits selective mixing with different additives in forming the various types of bagged plasters or different types of gypsum board. Thus, the drying procedure to be applied to a particular water treated material will be highly variable depending upon the degree of applicability of the above factors. In general, drying can be carried out by subjecting the healed calcined gypsum to hot gases (e.g. hot air ranging in temperature from about 300° F. to 700° F.) for several seconds to several minutes, preferably up to about 10 minutes in a continuous process.

In continuous operations, healing and drying may be performed sequentially as by passing the water treated stucco through covered screw conveyors for about 1–4 minutes (healing), which conveyors may optionally be subsequently provided with auxiliary drying air. Then the material may be air-veyed in a stream of hot air or other gas nonreactive with the stucco, such as flue gas, for a time sufficient to evaporate the remaining free moisture. A portion of the flue gas from the calcination process may be returned to the conveying line between water treatment and board formation, and/or the treated material may be passed through a heated cyclone and dust collector bag. Batch drying means may also be employed but art not preferred. In addition, there will be some evaporative drying while transporting the treated material to the board forming machine.

The treated and ground material may be combined with conventional additives in customary amounts to modify various properties of the calcined gypsum for use in making gypsum wallboard or plasters. For example, common chemical dispersing or fludizing agents for calcined gypsum, such as the lignins, lignosulfates, lignosulfonates and condensation polymerization products thereof may be included in minor amounts to enable the use of even less mixing water without interfering with the water reducing effects accomplished by the present invention. In this manner, it may be possible to achieve even lower total water mixing requirements, such as on the order of about 50 parts by weight of water per 100 parts by weight of the formulated calcined gypsum. The water treatment and healing procedures of this invention reduce the water demand for gypsum board manufacture to about 50 to about 85 parts by weight of water per 100 parts by weight of calcined gypsum, compared to a normal water demand of about 85 to 100 parts by weight of water.

In a highly preferred embodiment, it has now been found that continuously calcined gypsum originally having a surface area of about 3,000–5,500 square centimeters per gram that has been treated with the optimum of about 3% water can obtain a full recoupment of the strength characteristics of the original stucco without any appreciable loss of the water reduction effect by grinding the treated calcined gypsum to increase the surface area. Depending upon the particle size and the strength characteristics of the untreated stucco material, it has been found that at least about 80% of the normal strength can be recaptured by grinding. It is thus generally preferred, for example, on a calcined, natural gypsum material having a surface area of about 3,000 square centimeters per gram and acceptable strength characteristics, to grind the treated material to increase the surface area to about 7,500–9,000 square centimeters per gram ($cm^2/gm$), or a surface area of about 2.5 to 3 times the untreated material, in order to recapture the strength characteristics. Calcined gypsum material which has good inherent strength development characteristics and that has been treated with a small amount of water (1–3% by weight) generally requires less increase in surface area for full or nearly full strength recoupment, and in this case, grinding to increase the surface area up to about twice that of the untreated material will be highly satisfactory. On the other hand, calcined gypsum material that has either been treated with a large amount of water (4–10% by weight) or has less inherent original strength development properties ordinarily requires a higher degree of surface area increase generally from about 2.5 to about 4 times the surface area of the untreated material (e.g. 3,000–8,000 $cm^2/gm$ for chemical process gypsum).

The amount of grinding, however, appears to have variable adverse effects on the water reduction characteristics of the material. As fineness increases there is a gradual impairment of the reduced water demand effect, and as the higher limits of grinding are reached, there is suddenly a dramatic loss of the reduced water demand advantage. Thus, it will be appreciated that the increase in surface area required for a particular treated calcined gypsum depends upon the original material's inherent strength development capabilities, source of the gypsum, particle size of the calcined gypsum before water treatment, amount of water treatment and thoroughness of blending, length of healing time, and amount of strength recoupment desired.

Grinding is accomplished preferably in an impacting apparatus of the type wherein the materials are pulverized by smashing against the side walls of the apparatus such as in an Alpine or Raymond impact mill or an Entoleter mill. Such action is preferred over an abrading type of action in order to maintain uniform size reductions and to reduce the effects of frictional heat that might deleteriously affect the reduced water demand effect. However, depending upon the amount of grinding necessary and the temperature of grinding, abrading apparatus may be suitable for some materials.

The following examples will illustrate various specific embodiments of the process of the present invention. It is to be understood that the examples are by way of illustration only and in no way are to be construed as limitations on the present invention. For example, the hereinafter specific examples were for the preparation of gypsum board and plasters of particular weights, densities and strengths. It is well known to those skilled in the art that strength is primarily dependent upon density; and the present invention maintains the strength-density relationship without regard to how the product will be used, i.e. as to different weights of gypsum board or densities of plaster casts. Thus, while the specific examples refer to a compressive strength at a particular density such is by way of illustration only. For comparison purposes, a standard gypsum board having a density of about 42 pounds per cubic foot weighs about 1,750 pounds per thousand square feet for a one-half inch board, and a standard industrial neat plaster has a dry cube compressive strength of about 2500 psi at about 65–70 pounds per cubic foot (lbs./ft.$^3$) density. It should be understood that other plasters or boards of higher or lower weights and densities may be produced, with correspondingly lower or higher strengths, and such come within the scope of the present invention.

EXAMPLE 1

In a comparative evaluation, continuously calcined gypsums produced at different locations were treated in a laboratory scale line to incorporate 3% free moisture into the calcined gypsum and then healed. One of the gypsum sources (Source A) was from a location which produces gypsum board of exceptional core strength, and the other source (Source B) was from a location which produces gypsum board of marginal core strength. Source A material ordinarily has a water demand requirement for gypsum board production of about 1275 pounds per thousand square feet of half-inch gypsum board (including both water of hydration and excess water which must be evaporated) and a compressive strength of about 850 psi for casts of 42.1 lbs./ft.$^3$ density. Source B material ordinarily has a water demand requirement for gypsum board production of about 1,175 pounds per thousand square feet of half-inch thick board (also including both water of hydration and excess water) and a compressive strength of 600 psi for casts of 42.1 lbs./ft.$^3$ density. Generally at a density of 42.1 lbs./ft.$^3$ acceptable board has a slurry cube compressive strength for samples of calcined gypsum pulled off the board line at the slurry mixer approaching 600 psi. Laboratory evaluations do not duplicate the intensity of mixing of the board slurry mixer and slurry cube compressive strengths of the same calcined gypsum pulled off the line before the slurry mixer then slurried in laboratory equipment will thus be about 500–550 psi for casts of 42.1 lbs./ft.$^3$ density. The particular sample received from Source A when evaluated in the laboratory equipment had a surface area of 5,060 cm$^2$/gm and a compressive strength of 556 psi for casts of 42.1 lbs./ft.$^3$ density. The particular sample received from Source B had a surface area of 4,350 cm$^2$/gm and a compressive strength of 570 psi for casts of 42.1 lbs./ft.$^3$ density.

For these evaluations, charges of the particular calcined gypsum were placed in a Patterson Kelley Company Twin Shell Blender model LB-P-8 equipped with a rotating liquid blending bar. Charges of 4,000 grams of the particular calcined gypsum at room temperature were placed in the unit, and while rotating, 180 gram charges of room temperature water were metered into the calcined gypsum through the blending bar over a period of 40 seconds, and the treated material was allowed to heal for about 3–6 minutes at room temperature. Due to overspray of water sticking to the blender and evaporation during processing, only 3% by weight of free water was present in the calcined gypsum. The treated calcined gypsum was evaluated for strength development and for water demand requirements.

Results of the evaluation are set forth in Table I, with the strength of the treated material being reported as psi at 42.1 lbs./ft.$^3$ density, and water demand requirements reported as percentage of reduced water demand for ease of comparison.

TABLE I

| Material | Original Compressive Strength | Healed Compressive Strength | % Reduced Water Demand |
|---|---|---|---|
| Source A | 556 psi | 302 psi | 25% |
| Source B | 515 psi | 355 psi | 25% |

From Table I, it may be seen that the treated materials from both sources developed a 25% reduced water demand, but the strength was greatly decreased by the water treatment. In the case of the marginal strength source material (Source B), the cast strength of the water treated material had a lower percentage of strength loss from the untreated material, but the actual cast strength due to the lower original strength was too low for board production. Both were so low as to be unacceptable for commercial gypsum board.

Additional aliquots of these two source materials were treated as above to incorporate 3% free water at room temperature into the calcined gypsum, healed for 3–4 minutes and then the healed materials were ground on a Raymond laboratory impact mill. This was a motor-driven pulverizing unit, Model 315UP, equipped with a six inch diameter grinding chamber and a rotor carrying eight pivoted swing hammers on the grinding disc operating at about 3,600 rpm with various replaceable screens for controlling fineness of the grinding. The unit was operated without any screen in place to obtain surface areas of about 8,000 cm$^2$/gm and various sized screens in place for other increases in surface area. Evaluations of strength development and water demand requirements for the materials are set forth in Table II. It should be noted that a goal of about 20% reduction in water demand coupled with about 80% retention of normal strength in the case of naturally high strength gypsum source material, and over 90% of normal strength in the case of marginal or poor source material, is generally desired for satisfactory commercial board production.

TABLE II

| Material | Ground Surface Area | Compressive Strength | % Reduced Water Demand |
|---|---|---|---|
| Source A | 6040 cm$^2$/gm | 494 psi | 25% |
| Source A | 8100 cm$^2$/gm | 622 psi | 20% |
| Source B | 8100 cm$^2$gm | 567 psi | 17% |
| Source B | 12550 cm$^2$/gm | 824 psi | 1% |

From Table II it can be seen that grinding the treated material from both the good and marginal sources to around 8,000 cm$^2$/gm (about 20% increase in surface area for Source A material and about 86% increase in surface area for Source B material) still retained much of the water demand reduction while recapturing high percentages of the normal strength. However, in the case of the marginal source material (Source B), increased grinding of that material to about 12,500 cm$^2$/gm (about 3 times the surface area of the untreated material) in order to obtain even higher strength totally destroyed the water demand reduction advantage. Source A material with only a 20% increase in surface area was almost in the range of strength for acceptable board e.g. 500–550 psi for laboratory mixed samples.

EXAMPLE 2

For full sized plant trials to manufacture a completely acceptable gypsum board with the optimum amount (3%) free water in the healed material, a plant operating line was modified to insert in the conveying line, between the continuous calcination equipment and the slurry mixer, a water treater comprising a modified, horizontal, paddle type, continuous mixer. A conventional paddle mixer was modified to have an inlet and opposing outlet for continuous operation instead of batch dump operation and to have an about ⅜–½ inch threaded nipple on the side of the mixer about 6 inches from the calcined gypsum inlet to allow the injection of water at a rate of about 900 pounds per hour. The calcined gypsum to be treated had a surface area of about 3500 cm$^2$/gm and was metered horizontally into the mixer in a continuous stream at a rate of about 10–12 tons per hour. Blending of the water and calcined gypsum was accomplished as they moved through and were discharged from the mixer, and then, the treated material passed into covered feed screws to provide an about 3½ minute time delay for healing. The healed material was then metered into a rapidly moving airstream in an about 12 inch diameter pipe conveying 400 lbs./min. of healed material and 5925 standard cubic feet per minute of exhaust gases (from the calcination equipment) having an initial temperature of about 700° F. and an exit temperature of about 250° F. to air-vey and dry the treated material. The material then passed through a cyclone and dust collector bag for continuous operation and was conveyed to a grinder comprising an Entoleter centrifugal impact mill having a 12 pin rotor of 27 inch diameter operating at 5400 rpm. The material was metered through the Entoleter impact mill at 12 tons per hour and returned into the line feeding the gypsum board production machine, i.e. the slurry mixer.

Properties of samples taken at various times from different locations during the trials, while the various meterings and flow rates were being adjusted after initial stabilization of the system, are set forth in Table III.

TABLE III

| | Untreated Material with 3500 (cm$^2$/gm) Surface Area | Partly Healed * | Healed, Dried, with 7000 (cm$^2$/gm) Surface Area | Healed, Dried, with 9600 (cm$^2$/gm) Surface Area |
|---|---|---|---|---|
| Water Demand - lbs./M sq. ft. of ½" board | 1244 | 1128 | 991 | 915 |
| Dispersed Consistency - cc. | 130 | 109 | 85 | 85 |
| Set Suddenness - °F./minute | 9.4 | 7.7 | 7.3 | 10.0 |
| Slurry Cube Strength - psi at 42.1 lbs./ft.$^3$ Density | 798 | 638 | 590 | 822 |

*About 2% by weight of free water was added, but the material was not dried or ground because strength decreases expected on full 3% free water addition and healing would render board production line inoperable.

The particular continuously calcined gypsum being treated, after water treatment and healing only, would not have been suitable for passing into the gypsum board slurry mixer for production of board because the resultant board would have been too weak. The healed stucco material which had been ground to 7,000 cm$^2$/gm (about 2 times the surface area of the untreated material) was run on the board line for several days. Evaporation of excess water in drying the wet slurry was reduced about 20%; the kiln temperature in three drying zones was reduced about 22%; however, the general board quality including board strength, field hardness and edge hardness was not completely satisfactory for commercial gypsum board. The healed stucco material which had been ground to 9,600 cm$^2$/gm (about 2.75 times the surface area of the untreated material) was run on the board line for several days. At the best runs of that material on the plant line evaporation of excess water in drying the wet slurry was reduced 26%; the kiln speed in three drying zones was increased by 28% while maintaining the normal temperature for ordinary board production using the original continuously calcined gypsum, and the general board quality, including board strength, field hardness and edge hardness, showed substantial improvement over both board made from material ground to 7,000 cm$^2$/gm and previously prepared board produced from unground, healed continuous stucco. From Table III it is quite evident that such should have been the case since the evaluations of castings made from stucco sampled from the line before the board slurry mixer showed that the more finely ground material had more than recaptured the losses in slurry cube strength caused by the water treatment.

EXAMPLE 3

The process of the present invention was applied to the continuous production of bagged plaster bases. Production of calcined gypsum for plaster products differs from gypsum board production in that a whiter and purer gypsum source is used, and it is always batch calcined with special chemicals (e.g. calcium chloride) or other batch process changes to develop lower water demand plasters than are used in gypsum board. Generally, continuous calcination is not suitable for the preparation of such materials because the procedures used to provide lower water demand are not effective at the temperatures of continuous calcination. Further, the resultant plaster product requires different properties from board stucco since it will be mixed with water by the user for a longer period of time and with a different intensity of mixing than is encountered in the slurry mixer for gypsum board production. The end user of plaster is looking for a different fluidity in the wet plaster material than is encountered in the automated gypsum board line, and he rarely foams the slurry as is generally done in the board line. For purposes of plaster manufacture, "dispersed consistency" is determined in a different manner than as defined hereinabove for board production. Here it is the volume of water required to give a standard viscosity when 100 grams of calcined gypsum is dispersed by a sixty second mixing at very high intensity (as in a Waring blender) in order to more thoroughly disperse the calcined gypsum in the water and simulate the mixing conditions encountered by the end user. Ordinarily an industrial plaster base produced from material from the same gypsum source as the material in this Example, but which is batch calcined and contains calcium chloride to reduce the water requirement of the processed plaster, has a 60 second dispersed consistency of 100–105 cc. of water.

For this Example, the continuous calcination equipment ordinarily used in gypsum board production was thoroughly cleaned of its board quality gypsum and filled with a coarser, whiter gypsum rock ordinarily used in batch calcination to produce industrial plasters. After filling the continuous calciner in the normal fashion and operating continuously for a sufficient time to stabilize the system, the calcined gypsum discharging from the calciner was put through the water treater, conveying equipment, hot air drying, cyclone and dust collector bag, and Entoleter mill as described in Example 2; and then diverted to bins to feed a bagging operation instead of into the gypsum board slurry mixer. Continuously calcined gypsum having a surface area of 3,100 cm$^2$/gm was received from the calciner at about 315° F. and metered through the paddle blender at a rate of 10 tons per hour with water being metered in at a rate of 1,184 pounds per hour to add 5.92% water in the water blender, the water treater discharge temperature being about 215–220° F. This added about 3% by weight of free water to the stucco after allowing for evaporation during the healing time of 3½ minutes. The material was then dried as set forth in Example 2, the discharge temperature from the drying cyclone being about 240° F. Grinding was accomplished in a 36 pin Entoleter mill operating at 4,860 rpm, and the treated stucco was passed to a bagger to obtain 24.5 tons of sacked material. Analysis of the material showed that, although it was desirable to adjust the calcination exiting temperatures and holding time drying temperatures to obtain more complete conversion of the gypsum to hemihydrate, more precise control of free moisture level for healing and more accurate metering to the grinding unit, an industrial plaster base and building plaster white goods base having satisfactory strength and fluidity properties could satisfactorily be produced by continuous calcination.

The same starting material gypsum rock, which had been batch calcined with calcium chloride added, had a 60 second dispersed consistency of 101–105 cc., and dry cube compressive strength of 2,567 psi at 67.7 pounds per cubic foot density when mixed with water at 75 cc. normal consistency. Samples from various times of the run of this Example treated to contain 3% free water with a healing time of 3–7 minutes, dried and ground to a surface area of 6600 cm$^2$/gm (about 2 times the surface area of the untreated material), had a 60 second dispersed consistency of 81–83 cc. and dry cube compressive strength of 2,583 psi at 66.6 pounds per cubic foot density when mixed with water at 75 cc. normal consistency. Soaking, mixing and other properties were comparable to commercial batch calcined industrial plaster.

Having completely described this invention, what is claimed is:

1. An improved process for manufacturing gypsum board characterized by using a reduced amount of water to fluidize calcined gypsum in forming a gypsum slurry which is fed to a board making machine while maintaining the compressive strength of the dried gypsum board which comprises:
   (1) supplying calcined gypsum feed to be conveyed to a gypsum slurry mixer;
   (2) conveying the calcined gypsum feed to a blender;
   (3) blending a small amount of water with said calcined gypsum, said water ranging from about 1% to about 10% by weight of the calcined gypsum feed;
   (4) allowing the water treated calcined gypsum to heal;
   (5) grinding the healed calcined gypsum to increase the surface area of the healed gypsum particles, whereby the surface is reactivated to improve the rate of strength development and the ultimate strength of the gypsum board product;
   (6) feeding the healed and ground calcined gypsum to a gypsum slurry mixer;
   (7) adding additional water to the healed and ground calcined gypsum in the slurry mixer, said additional water being added in an amount sufficient to provide from about 50 to about 85 parts of water, including water added in the blender, per 100 parts of the calcined gypsum which results in a substantially reduced amount of water to be evaporated from the wet board;
   (8) mixing the healed and ground calcined gypsum and water in the slurry mixer to form a homogeneous slurry;
   (9) feeding the slurry to a gypsum board making machine to form a wet gypsum board;
   (10) passing the wet gypsum board to a kiln to dry the board; and
   (11) recovering dry gypsum board consisting essentially of calcium sulfate dihydrate.

2. The process of claim 1 wherein the grinding in step (5) increases the surface area up to about 4 times the surface area of the untreated calcined gypsum.

3. The process of claim 1 wherein the grinding in step (5) increases the surface area to at least about twice the surface area of the untreated calcined gypsum.

4. The process of claim 1 wherein the calcined gypsum feed is from natural rock and has a surface area of about 3,000–5,500 square centimeters per gram (Blaine), and the grinding in step (5) increases the surface area to about 7,500–9,000 square centimeters per gram (Blaine).

5. The process of claim 1 wherein the calcined gypsum feed is derived from chemical processes and has a surface area of about 1,500–2,000 square centimeters per gram (Blaine), and the grinding in step (5) increases the surface area to about 3,000–8,000 square centimeters per gram (Blaine).

6. The process of claim 1 wherein the small amount of water which is blended with the calcined gypsum in step (3) is in the form of steam.

7. The process of claim 1 wherein the additional step of drying the treated and healed calcined gypsum is carried out after the healing procedure in step (4) and prior to the grinding procedure in step (5) by subjecting the healed calcined gypsum to an elevated temperature.

8. The process of claim 7 wherein the dried and healed calcined gypsum material is stored for a period of time prior to the grinding procedure in step (5).

9. In a process for manufacturing gypsum board of the type wherein a small amount of water is blended with the calcined gypsum feed and the water treated calcined gypsum is allowed to heal, the healed calcined gypsum is fed to the gypsum slurry mixer, additional water is added to the slurry mixer and the healed mixture of calcined gypsum and water is mixed in the slurry mixer to form a homogeneous slurry, the slurry is fed to a gypsum board making machine to form a wet gypsum board, and the wet gypsum board is dried in a kiln to recover dry gypsum board consisting essentially of calcium sulfate dihydrate; wherein the improvement comprises: grinding the healed calcined gypsum to increase the surface area of the healed gypsum particles, whereby the surface is reactivated to improve the rate of strength development and the ultimate strength of the gypsum board product.

10. The process of claim 9 wherein the grinding increases the surface area up to about 4 times the surface area of the untreated calcined gypsum.

11. The process of claim 9 wherein the grinding increases the surface area to at least about twice the surface area of the untreated calcined gypsum.

12. An improved process for preparing calcined gypsum characterized by providing the calcined gypsum with a reduced water demand while maintaining its ability to develop full compressive strength in a cast gypsum product which comprises:
 (1) supplying calcined gypsum feed to be conveyed to a blender;
 (2) conveying the calcined gypsum feed to the blender;
 (3) blending a small amount of water with said calcined gypsum, said water ranging from about 1% to about 10% by weight of the calcined gypsum feed;
 (4) allowing the water treated calcined gypsum to heal;
 (5) drying the healed calcined gypsum by subjecting it to elevated temperatures;
 (6) grinding the dried, healed calcined gypsum to increase the surface area of the healed gypsum particles, whereby the surface is reactivated to improve the rate of strength development and the ultimate strength in a gypsum product; and
 (7) recovering a dried, healed calcined gypsum which is storage stable, has reduced water demand and is capable of developing substantially full compressive strength in a gypsum product.

13. The process of claim 12 wherein the grinding in step (6) increases the surface area up to about 4 times the surface area of the untreated calcined gypsum.

14. The process of claim 12 wherein the grinding in step (6) increases the surface area to at least about twice the surface area of the untreated calcined gypsum.

15. The process of claim 12 wherein the calcined gypsum feed is from natural rock and has a surface area of about 3,000–5,500 square centimeters per gram (Blaine), and the grinding in step (6) increases the surface area to about 7,500–9,000 square centimeters per gram (Blaine).

16. The process of claim 12 wherein the calcined gypsum feed is derived from chemical processes and has a surface area of about 1,500–2,000 square centimeters per gram (Blaine), and the grinding in step (6) increases the surface area to about 3,000–8,000 square centimeters per gram (Blaine).

17. The process of claim 12 wherein the small amount of water which is blended with the calcined gypsum in step (3) is in the form of steam.

18. The process of claim 12 wherein the dried and healed calcined gypsum material is stored for a period of time prior to the grinding procedure in step (6).

19. In a process for manufacturing calcined gypsum of the type wherein calcined gypsum is fed to a blender, a small amount of water is blended with the calcined gypsum in the blender, and the water treated calcined gypsum is allowed to heal whereby the healed calcined gypsum has a reduced water demand; wherein the improvement comprises: drying the healed calcined gypsum; and subsequently grinding the dried, healed, calcined gyspum to increase the surface area of the healed gypsum particles, whereby the surface is reactivated to improve the rate of strength development and the ultimate strength in gypsum product.

20. The process of claim 19 wherein the grinding increases the surface area up to about 4 times the surface area of the untreated calcined gypsum.

21. The process of claim 19 wherein the grinding increases the surface area to at least about twice the surface area of the untreated calcined gypsum.

* * * * *